United States Patent

Hagiwara

[11] Patent Number: 5,535,868
[45] Date of Patent: Jul. 16, 1996

[54] VISCOUS FLUID COUPLING DEVICE

[75] Inventor: Mitsutoshi Hagiwara, Aichi, Japan

[73] Assignee: Aisin Seiki Kabushiki Kaisha, Kariya, Japan

[21] Appl. No.: 292,288

[22] Filed: Aug. 18, 1994

[30]  Foreign Application Priority Data

Aug. 23, 1993 [JP] Japan .................................. 5-207399

[51] Int. Cl.⁶ .................................................. F16D 35/02
[52] U.S. Cl. ........................................ 192/58.65; 192/82 T
[58] Field of Search ................................ 192/58 B, 82 T, 192/58.65, 58.67, 58.682

[56]  References Cited

U.S. PATENT DOCUMENTS

| | | | |
|---|---|---|---|
| 3,363,734 | 1/1968 | Sabat | 192/58 B |
| 4,606,445 | 8/1986 | Rockey | 192/58 B |
| 4,979,601 | 12/1990 | Hagiwara et al. . | |
| 5,190,131 | 3/1993 | Hagiwara et al. . | |

FOREIGN PATENT DOCUMENTS

| | | | |
|---|---|---|---|
| 62-31726 | 2/1987 | Japan | 192/58 B |
| 3-56328 | 8/1991 | Japan . | |
| 3-114635 | 11/1991 | Japan . | |
| 2249819 | 5/1992 | United Kingdom | 192/58 B |

Primary Examiner—Richard M. Lorence
Attorney, Agent, or Firm—Oblon, Spivak, McClelland, Maier & Neustadt

[57]  ABSTRACT

A viscous fluid coupling device comprises a housing; a partition board dividing an internal space in the housing into a storage chamber and an operation chamber, the partition board having first communicating holes to communicate the storage chamber with the operation chamber; a rotor which is provided in the operation chamber and is secured to one end portion of a drive shaft so as to rotate together with the drive shaft; a valve provided in the storage chamber to open and close the first communicating holes; and a rod having one end secured to the valve and the other end secured to the inner peripheral portion of a spiral bimetal. The rod is rotatably supported by the housing and the housing and the rotor have labyrinth grooves in the surfaces which are confronted with each other. The viscous fluid coupling device further comprises a second communicating hole which is located radially inwardly of the labyrinth grooves to discharge the viscous fluid from the operation chamber into an internal space of the operation chamber when the viscous fluid is raised high in temperature; and a temperature responding member connected to a seal member to open and close the second communicating hole.

7 Claims, 4 Drawing Sheets

VISCOUS FLUID COUPLING DEVICE

BACKGROUND OF THE INVENTION

1. Field of the Invention

This invention relates to a viscous fluid coupling device used to control an engine cooling fan.

2. Description of the Related Art

A conventional viscous fluid coupling device of this type has been disclosed by Japanese Utility Model Unexamined Application No. Hei 3-114635 published in 1991. The viscous fluid coupling device comprises: a housing; a partition board dividing the internal space in the housing into a storage chamber and an operation chamber, the partition board having communicating holes to communicate the storage chamber with the operation chamber; a rotor which is provided in the operation chamber and is secured to one end portion of a drive shaft so as to rotate together with the drive shaft; a valve provided in the storage chamber to open and close the communicating holes; and a rod having one end secured to the valve and the other end secured to the inner peripheral portion of a spiral bimetal, the rod being rotatably supported by the housing, the housing and the rotor having labyrinth grooves in the surfaces which are confronted with each other. In the device, the communicating holes formed in the partition board are opened and closed by the valve provided in the storage chamber, to move the viscous fluid from the storage chamber into the operation chamber. When the temperature responding member senses a low temperature, the valve operates to close the communicating holes with the aid of the rod; and when it senses a high temperature, the valve operates to open the communicating holes.

The conventional viscous fluid coupling device thus constructed is disadvantageous in the following points:

When, for instance, in an automobile equipped with the device, the engine speed exceeds the regular range of speeds, then the temperatures sensed by the temperature responding member are all high, so that the valve operates to open the communicating holes at all times, and accordingly the viscous fluid is caused to flow from the storage chamber into the operation chamber. As a result, the engine speed is increased, and the fan speed is also increased. When the fan speed is increased to an excessively high value, the noise from the fan is increased, and the temperature of the internal viscous fluid is increased extremely by shearing. As a result, the viscous fluid is thermally deteriorated, and the device is therefore greatly lowered in performance.

When the engine speed has been increased beyond the regular range of speeds during high speed traveling, the speed of the fan is substantially maintained unchanged after being increased to a certain high value, whereas the temperature of the viscous fluid is kept increased. On the other hand, the engine can be cooled down with the wind produced during traveling. Therefore, it is substantially unnecessary to rotate the fan at high speed after the engine speed has exceeded the regular range of speeds.

SUMMARY OF THE INVENTION

In view of the foregoing, an object of this invention is to provide a viscous fluid coupling device which, when the engine speed is high, the speed of the engine cooling fan is decreased, the noise from the fan is suppressed, and the viscous fluid is prevented from being thermally deteriorated.

The foregoing object and other objects of the invention have been achieved by the provision of a viscous fluid coupling device comprising: a housing; a partition board dividing an internal space in the housing into a storage chamber and an operation chamber, the partition board having first communicating holes to communicate the storage chamber with the operation chamber; a rotor which is provided in the operation chamber and is secured to one end portion of a drive shaft so as to rotate together with the drive shaft; a valve provided in the storage chamber to open and close the first communicating holes; a rod having one end secured to the valve and the other end secured to the inner peripheral portion of a spiral bimetal, the rod being rotatably supported by the housing, the housing and the rotor having labyrinth grooves in the surfaces which are confronted with each other; a second communicating hole which is located radially inwardly of the labyrinth grooves to discharge the viscous fluid from the operation chamber into an internal space of the operation chamber when the viscous fluid is raised high in temperature; and a temperature responding member connected to a seal member to open and close the second communicating hole.

The viscous fluid coupling device according to the invention has the communicating hole which is provided in the shearing section provided with respect to the rotor to discharge the viscous fluid from the operation chamber which has been raised high in temperature, and the temperature responding member connected to the seal member to open and close the communicating hole. Hence, the viscous fluid which is made high in temperature being sheared at the shearing section can be discharged directly, with the results that the rotation of the engine cooling fan is decreased, the viscous fluid is prevented from being thermally deteriorated, and the noise from the fan is decreased.

The nature, utility and principle of the invention will be more clearly understood from the following detailed description and the appended claim when read in conjunction with the accompanying drawings.

DETAILED DESCRIPTION OF THE PREFERRED EMBODIMENT

A viscous fluid coupling device, which constitutes one preferred embodiment of this invention, will be described with reference to the accompanying drawings.

Figure 1:
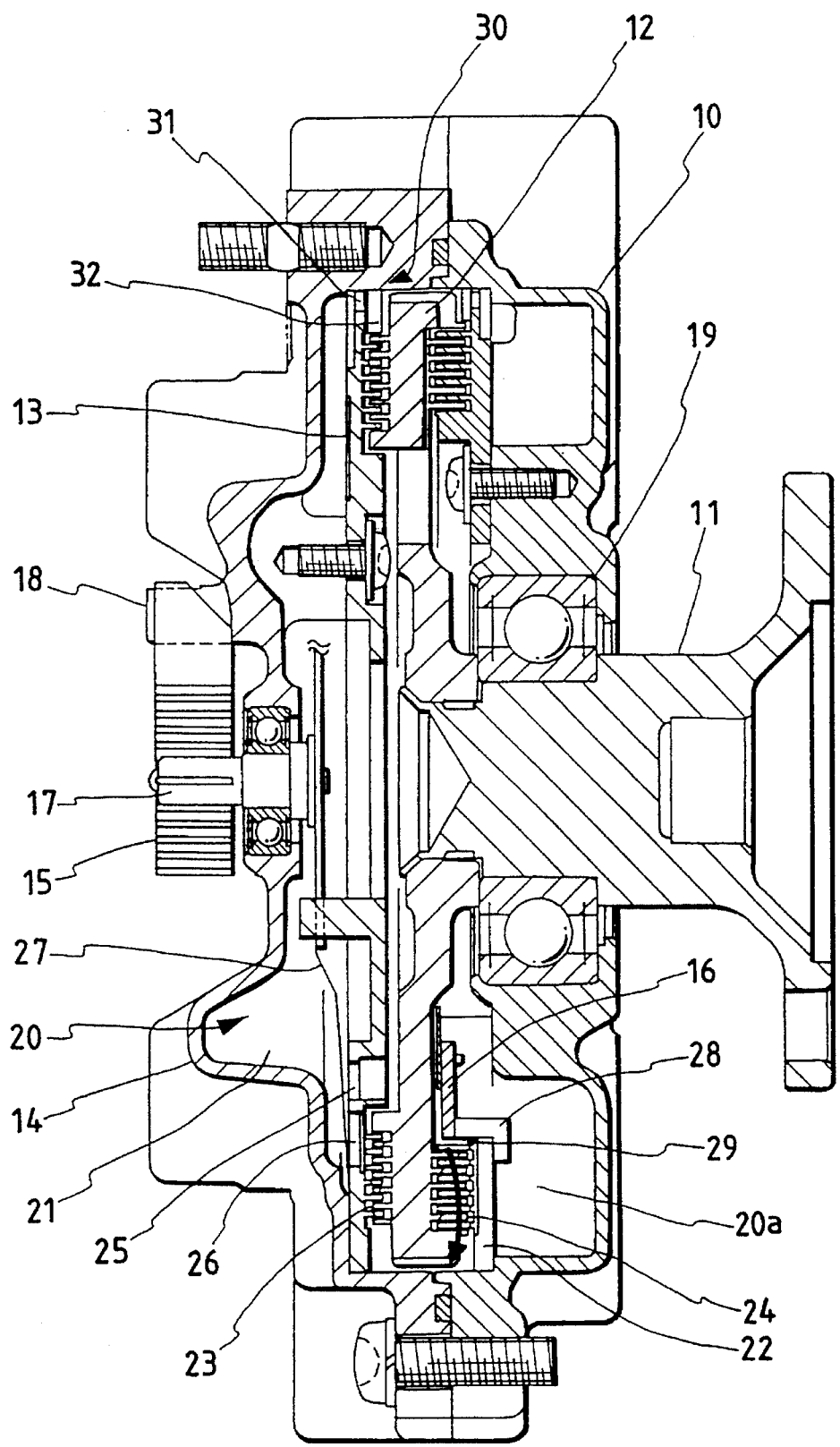
FIG. 1 is a sectional view of a viscous fluid coupling device according to one embodiment of this invention.

The viscous fluid coupling device, as shown in FIG. 1, comprises: a housing 10; a drive shaft 11; a rotor 12; a partition board 13; a cover 14; temperature responding members 15 and 16 (hereinafter referred to as "bimetals 15 and 16"); a rod 17; and a bimetal holder 18. The housing 10 and the drive shaft 11 are engaged through a bearing 19 with each other in such a manner that they are rotatable with respect to each other. The cover 14 is fixedly secured to the housing 10 to define an internal space 20. The partition board 13 is fixedly secured to the cover 14 to divide the internal space into a storage chamber 21 and an operation chamber 22. The rotor 12 is accommodated in the operation chamber 22. The surfaces of the housing 10 and the rotor 12 which are confronted with each other, and the surfaces of the cover 14 and the rotor 12 which are also confronted with each other have labyrinth grooves 23 and 24, respectively.

The partition board 13 has communicating holes 25 and 26 (those only on one side shown) through which the storage chamber 20 is communicated with the operation chamber 22. Those communicating holes 25 and 26 are opened and closed by valve 27 which is turned through a rod 17 by the spiral bimetal 15 which senses an air temperature at the rear of a radiator. A pump mechanism 30 is provided along the outer periphery of the partition board 13. The outer peripheral portion of the spiral bimetal 15 is bent, and the portion thus bent is fixed by the metal holder 18 which is secured to the cover 14.

The pump mechanism 30 is made up of pump holes 31 formed in the partition board 13, and pump protrusion 32 formed on the partition board 13.

The internal space 20 is filled with viscous fluid.

Now, the bimetal 16 arranged between the rotor 12 and housing 10, which is one of the features of the invention, will be described.

Figure 3:
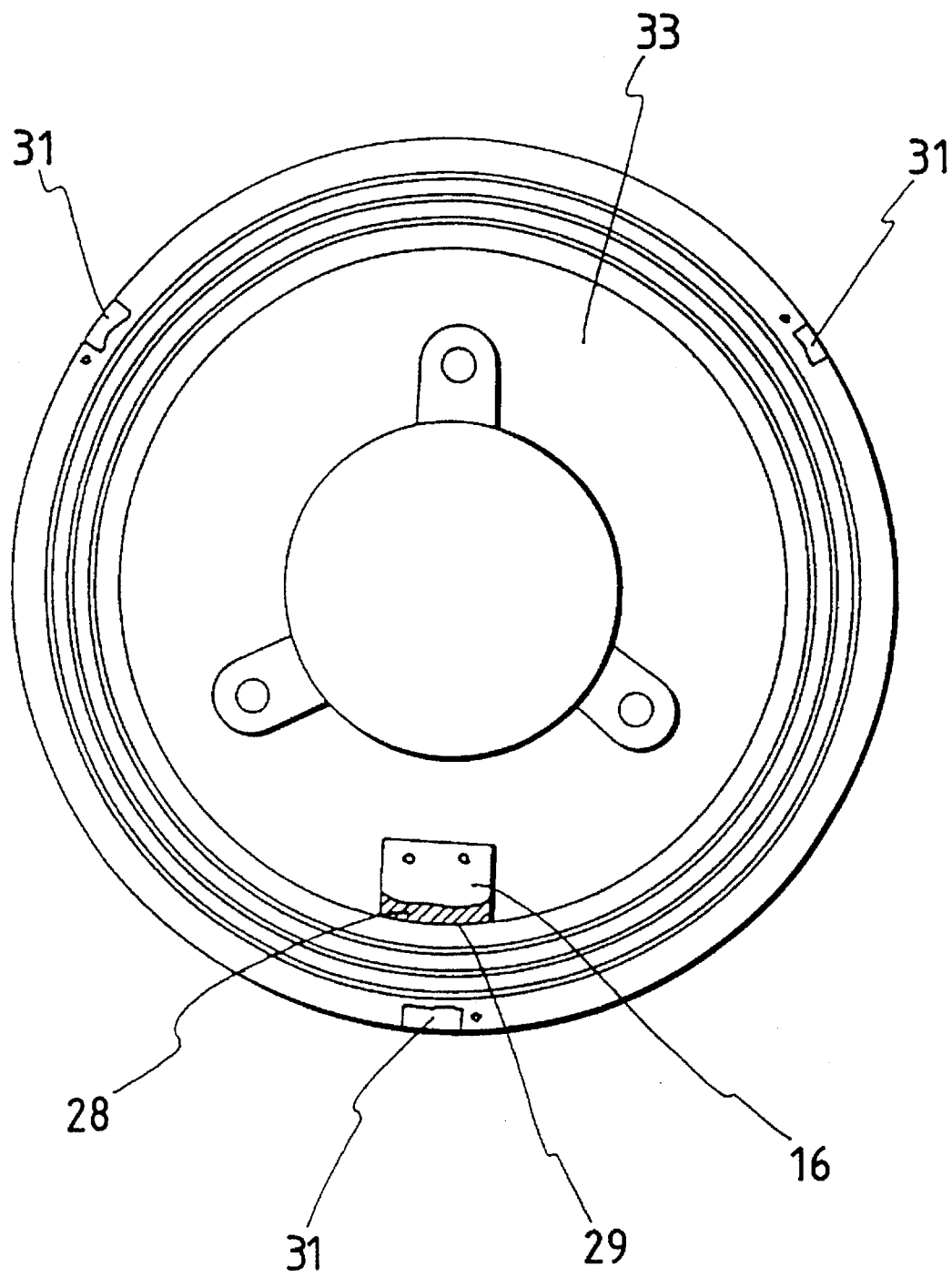
FIG. 3 is a plan view of the temperature responding member.

When the speed (the number of revolutions per minute) of the engine increases so that the engine cooling fan is rotated at higher speed than required, then the noise from the fan is increased, while the temperature of the viscous fluid is greatly increased by shearing, so that the viscous fluid coupling device is lowered in function. In order to prevent this difficulty, as shown in FIG. 3 the bimetal 16 and a seal member 28 are provided in such a manner that they operate to open and close a communicating hole 29 which is located radially inwardly of the labyrinth grooves 24. The bimetal 16 is fixedly secured to a back plate 33, and the seal member 28 is connected to one end of the bimetal 16 in such a manner that it is able to open and close the communicating hole 29. When the temperature of the viscous fluid becomes high, the bimetal 16 operates to open the communicating hole 29.

Figure 4:
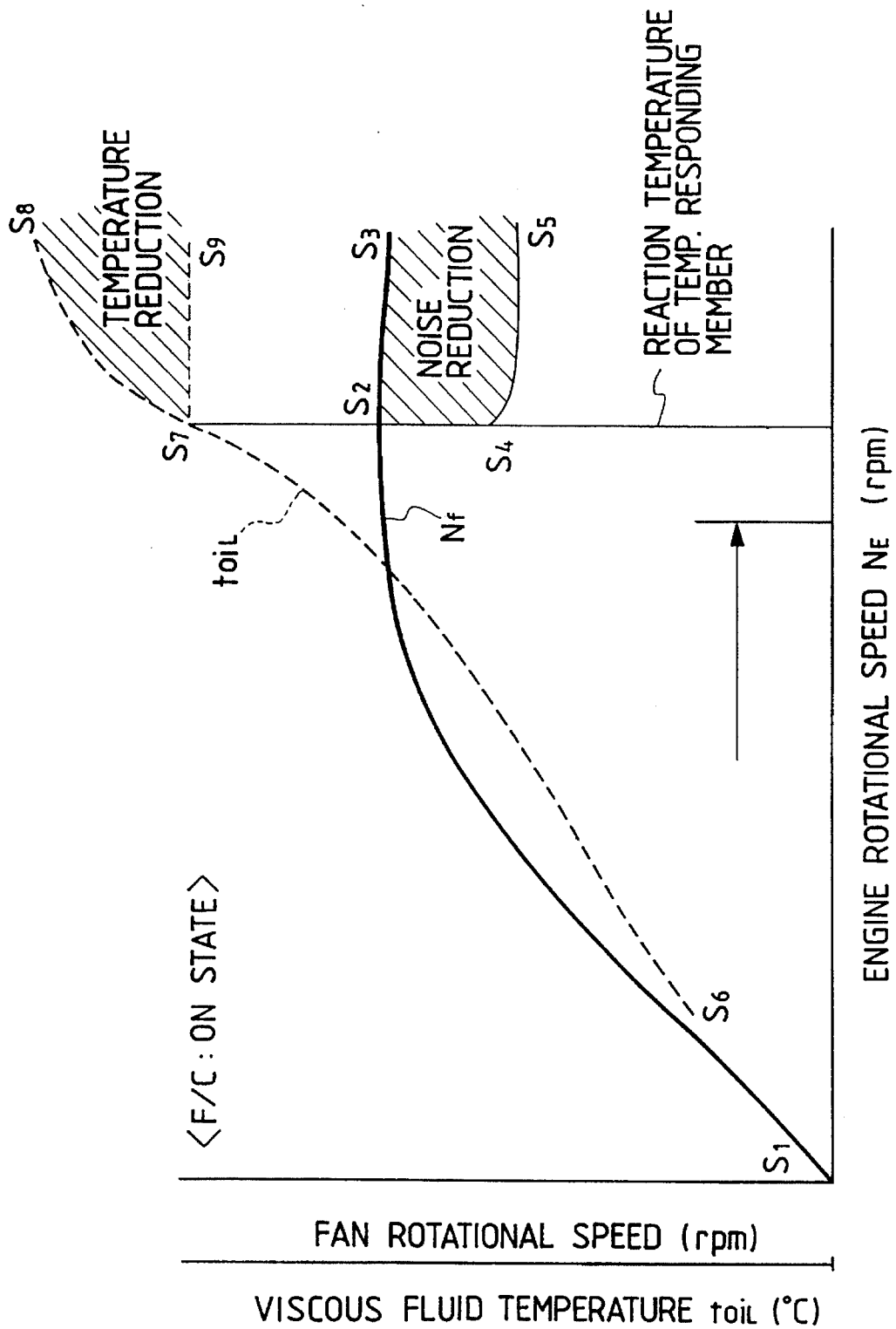
FIG. 4 graphical representation with engine speeds on the horizontal axis and with fan speeds and oil temperatures on the vertical axis.

FIG. 4 is a graphical representation indicating the speeds (rpm) of the engine cooling fan and the temperatures of the viscous fluid with the speeds (rpm) of the engine exceeding the regular range of speeds. With the conventional viscous fluid coupling device, the fan speed (Nf) changes as S1→S2→S3, and the viscous fluid temperature ($t_{oil}$) changes as S6→S7→S8. On the other hand, with the viscous fluid coupling device of the invention, the fan speed (Nf) changes as S1→S2→S4→S5, and the viscous fluid temperature ($t_{oil}$) changes as S6→S7→S9.

The operation of the viscous fluid coupling device thus constructed will be described.

The drive shaft 11 is rotated by the drive transmitting means of the automobile engine (not shown), and at the same time the rotor 12 is rotated together with the drive shaft, so that the pump mechanism 30 operates to cause the viscous fluid to flow from the operation chamber 22 into the storage chamber 21.

If, in this case, the air temperature sensed by the bimetal 15 is low, then the communicating holes 25 and 26 are closed by the valve 27. Hence, almost all the viscous fluid in the operation chamber 22 is moved into the storage chamber 21 by the action of the pump mechanism 30. Therefore, the torque transmission is scarcely effected at the labyrinth grooves 24 in the operation chamber 22, so that the engine cooling fan secured to the cover 14 is merely allowed to rotate at low speed.

When the temperature sensed by the bimetal 15 is high, the bimetal turns the valve 27 to open the communicating holes 25 and 26, so that the viscous fluid is allowed to flow from the storage chamber 21 into the operation chamber 22.

Figure 2:
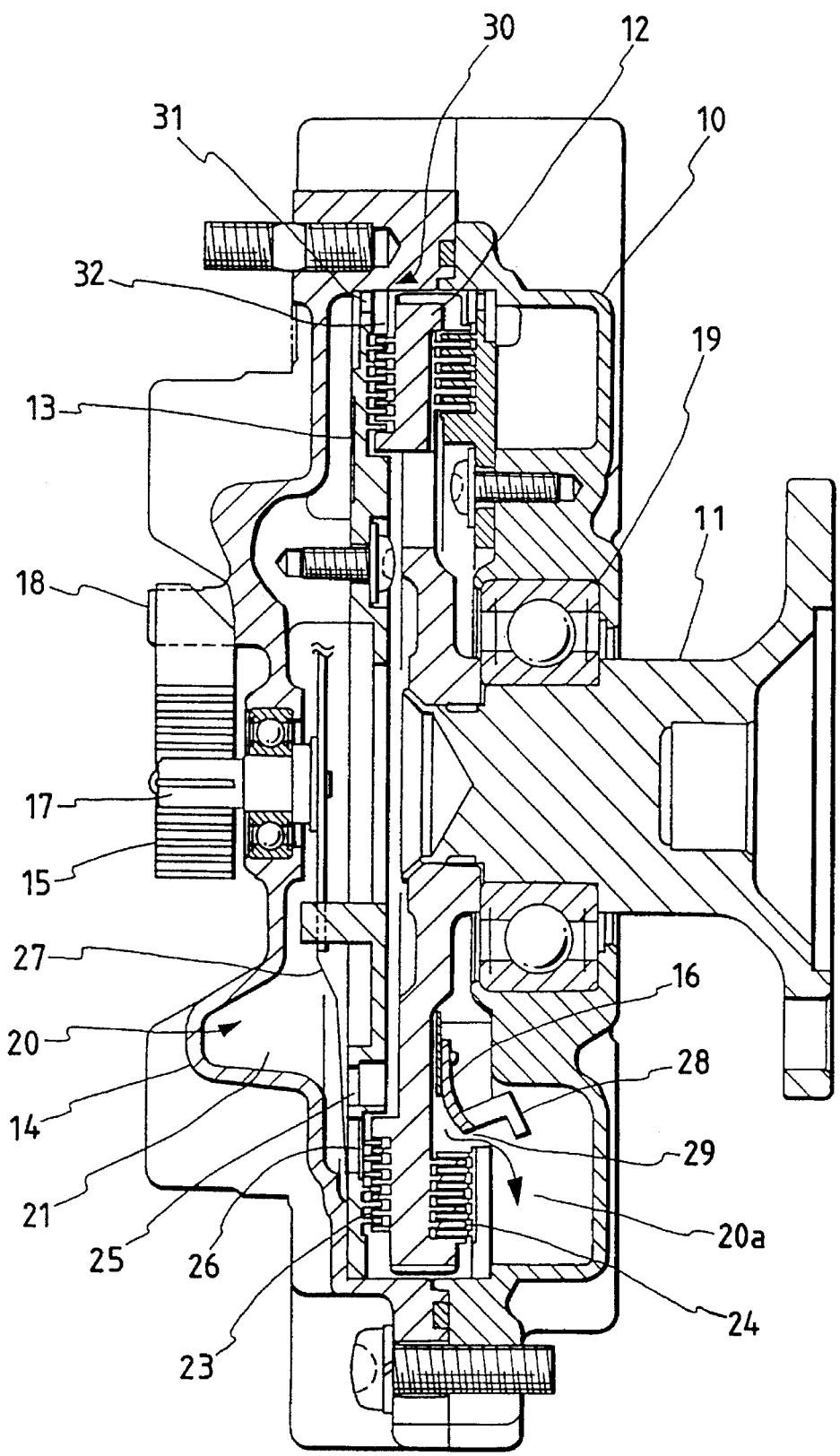
FIG. 2 is also a section view of the viscous fluid coupling device, showing a temperature responding member which is in the open state.

When the temperature sensed by the bimetal 15 is further high, it becomes unnecessary to rotate the fan. In this case, as shown in FIG. 2, the bimetal 16 senses the high temperature of the viscous fluid, so that the communicating hole 29 is opened. As a result, the viscous fluid is discharged from the operation chamber 22 into an internal space 20a. The viscous fluid thus discharged is allowed to flow through a communicating hole (not shown) into the operation chamber, thus being returned into the storage chamber. In this case, no viscous fluid flows in the labyrinth grooves 24, and the viscous fluid is sheared only at the labyrinth grooves 23, so that the rotation of the fan is decreased. In addition, the temperature rise of the viscous fluid can be prevented after the engine speed has been increased beyond the regular range of speeds.

The viscous fluid coupling device according to the invention has the communicating hole which is provided in the shearing section provided with respect to the rotor to discharge the viscous fluid from the operation chamber which has been raised high in temperature, and the temperature responding member which is connected to the seal member to open and close the communicating hole. Hence, the viscous fluid which has been increased high in temperature being sheared at the shearing section can be discharged directly, with the results that the rotation of the fan is decreased, the viscous fluid is prevented from being thermally deteriorated, and the noise from the fan is decreased.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A viscous fluid coupling device, comprising:

a housing secured to a cover so as to define an internal space therein filled with viscous fluid;

a partition board positioned within said housing and said cover to divide the internal space filled with viscous fluid into a storage chamber and an operation chamber, said partition board having first communication holes to communicate said storage chamber with said operation chamber;

first open/close means for opening and closing said first communicating holes according to a temperature around said device;

a drive shaft rotatably engaged with said housing;

a rotor provided in said operation chamber and secured to one end portion of said drive shaft to rotate together with said drive shaft, said housing and said rotor having labyrinth grooves in surfaces thereof which are confronted with each other;

a second communicating hole formed in said housing and located entirely radially inwardly of said labyrinth grooves to discharge the viscous fluid from said operation chamber into said storage chamber; and second open/close means provided in said operation chamber for opening and closing said second communicating hole according to a temperature of the viscous fluid in said operation chamber.

2. A viscous fluid coupling device according to claim 1, wherein said first open/close means comprises a valve provided in said storage chamber to open and close said first communicating holes; a spiral bimetal; and a rod having one end secured to said valve and the other end secured to an inner peripheral portion of said spiral bimetal, said rod being rotatably supported by said housing.

3. A viscous fluid coupling device according to claim 1, wherein said second open/close means comprises a seal member; and a temperature responding member connected to said housing and said seal member to open and close said second communicating hole according to a temperature of the viscous fluid in said operation chamber.

4. A viscous fluid coupling device according to claim 3, wherein said temperature responding member comprises a bimetal.

5. A viscous fluid coupling device according to claim 1, wherein said first open/close means opens said first communicating holes when air temperature around said device exceeds a first temperature, and said second open/close means opens said second communicating hole when the temperature of the viscous fluid in said operation chamber exceeds a second temperature.

6. A viscous fluid coupling device according to claim 1, further comprising a pump mechanism for causing the viscous fluid to flow from said operating chamber into said storage chamber, said pump mechanism being located radially outwardly of said labyrinth grooves.

7. A viscous fluid coupling device according to claim 6, wherein said pump mechanism comprises pump holes formed in said partition board and a pump protrusion formed on said partition board.

\* \* \* \* \*